(12) United States Patent
Kowalski, Jr. et al.

(10) Patent No.: US 11,559,054 B2
(45) Date of Patent: Jan. 24, 2023

(54) BIRD EXCREMENT SHIELDS FOR ELECTRIC POWER TRANSMISSION TOWERS

(71) Applicant: Duke Energy Corporation, Charlotte, NC (US)

(72) Inventors: Brian J. Kowalski, Jr., Yankeetown, FL (US); William Hunter, Raleigh, NC (US); Joseph Comstock, Raeford, NC (US)

(73) Assignee: Duke Energy Corporation, Charlotte, NC (US)

( * ) Notice: Subject to any disclaimer, the term of this patent is extended or adjusted under 35 U.S.C. 154(b) by 220 days.

(21) Appl. No.: 17/121,395

(22) Filed: Dec. 14, 2020

(65) Prior Publication Data

US 2022/0183269 A1 Jun. 16, 2022

(51) Int. Cl.
| | |
|---|---|
| *A01M 29/32* | (2011.01) |
| *H02G 1/02* | (2006.01) |
| *H02G 7/00* | (2006.01) |
| *H01B 17/38* | (2006.01) |

(52) U.S. Cl.
CPC .............. *A01M 29/32* (2013.01); *H01B 17/38* (2013.01); *H02G 1/02* (2013.01); *H02G 7/00* (2013.01)

(58) Field of Classification Search
CPC ....... A01M 29/32; H01B 17/38; H01B 17/00; H02G 1/02; H02G 7/00; E04H 12/24; E04H 12/10
USPC .................................. 52/651.02, 101, 651.01
See application file for complete search history.

(56) References Cited

U.S. PATENT DOCUMENTS

| | | | | |
|---|---|---|---|---|
| 933,493 | A * | 9/1909 | Scholes .................... | E04H 12/10 52/651.02 |
| 1,859,152 | A * | 5/1932 | Obbard .................... | E04H 12/10 52/651.02 |
| 3,299,586 | A * | 1/1967 | Hockaday ................ | H02G 7/20 174/45 R |
| 5,682,015 | A * | 10/1997 | Harben .................... | H02B 1/06 174/138 R |
| 6,248,956 | B1 * | 6/2001 | Cook ........................ | H02G 7/00 174/154 |
| 6,255,597 | B1 * | 7/2001 | Bowling ................ | H01B 17/00 174/138 F |

(Continued)

FOREIGN PATENT DOCUMENTS

| | | | |
|---|---|---|---|
| CN | 210828564 U | * | 6/2020 |
| CN | 212724864 U | * | 3/2021 |

*Primary Examiner* — Brent W Herring
(74) *Attorney, Agent, or Firm* — Myers Bigel, P.A.

(57) ABSTRACT

A shield system for an electric power transmission tower includes a plurality of panels configured to be secured to a cross-arm structure of the tower in adjacent, end-to-end arrangement so as to overlie insulators supported by the tower and prevent excrement from birds nesting and/or congregating on the tower from contacting and accumulating on the insulators. Each panel has opposite ends and opposite lateral edges extending between the opposite ends. A plurality of spaced-apart apertures are formed in each panel adjacent each of the lateral edges and at least one of the ends, and each aperture is configured to receive a respective fastener therethrough for securing the panel to the cross-arm structure. Each panel has a shape that generally conforms to a shape of a portion of the cross-arm structure to which the panel is secured.

19 Claims, 9 Drawing Sheets

(56) References Cited

U.S. PATENT DOCUMENTS

| | | | | |
|---|---|---|---|---|
| 6,770,809 B1* | 8/2004 | De France | ............ | H01B 17/00 |
| | | | | 174/138 R |
| 7,297,869 B2* | 11/2007 | Hiller | .................... | H01B 17/00 |
| | | | | 174/45 R |
| 8,067,691 B2* | 11/2011 | Puigcerver | ............. | H01B 17/00 |
| | | | | 174/172 |
| 2005/0210769 A1* | 9/2005 | Harvey | ................... | H02G 7/00 |
| | | | | 52/101 |
| 2020/0075198 A1* | 3/2020 | Tauber | .................. | H01B 17/12 |
| 2021/0360912 A1* | 11/2021 | Schwartz | ............. | A01M 29/06 |

* cited by examiner

BIRD EXCREMENT SHIELDS FOR ELECTRIC POWER TRANSMISSION TOWERS

FIELD OF THE INVENTION

The present invention relates generally to towers and, more particularly, to electric power transmission towers.

BACKGROUND OF THE INVENTION

Birds, particularly large birds such as buzzards, like to perch and nest on top of electric power transmission towers and structures. Insulators that support electric power cables are suspended from these towers and structures. Unfortunately, excrement from nesting/perching birds may accumulate on the insulators which may cause a short circuit and subsequent power outage. Cleaning bird excrement from insulators is time consuming and expensive. As such, various ways of discouraging birds from nesting and congregating on electric power transmission towers and structures have been tried.

Figure 1:
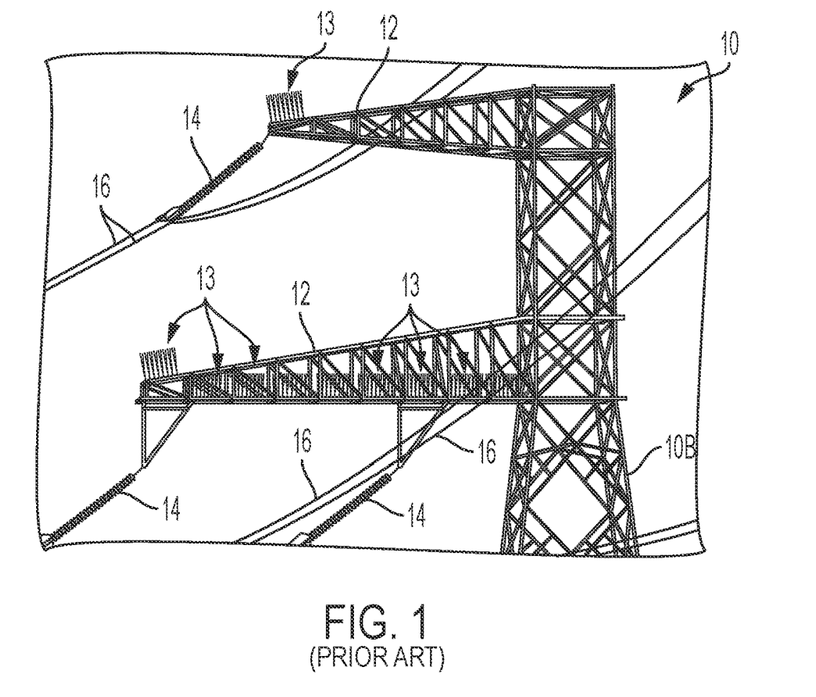
FIG. 1 illustrates an electric power transmission tower having spikes on the cross-arms thereof for discouraging birds from perching.

For example, FIG. 1 illustrates an electric power transmission tower 10 having a base 10B that supports cross-arms 12. Suspended from the cross-arms 12 are insulators 14 that support electric power cables 16. The cross-arms 12 have spikes 13 extending upwardly therefrom to discourage birds from nesting and congregating on the cross-arms 12. Unfortunately, birds can still perch on other portions of the tower 10 not having spikes 13, which may allow for bird excrement accumulation on underlying insulators 14. In addition, the installation of spikes 13 as illustrated in FIG. 1 may be time consuming and expensive.

Another method of preventing the accumulation of bird excrement on insulators involved cutting large (e.g., 36" diameter) corrugated pipe into sections and mounting these to the cross-arms of towers. Unfortunately, large diameter corrugated pipe sections are cumbersome, difficult to cut, and difficult to handle and mount. Moreover, the procedure of cutting and mounting large corrugated pipe sections can be labor intensive and expensive.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Embodiments of the present invention provide a shield system for an electric power transmission tower having a base, a cross-arm structure supported by the base, and one or more insulators suspended from the cross-arm structure that support one or more electric cables. The shield system includes a plurality of panels configured to be secured to the cross-arm structure in adjacent, end-to-end arrangement so as to overlie the one or more insulators and prevent excrement from birds nesting and congregating on the tower from contacting and accumulating on the one or more insulators. For example, the cross-arm structure may be a trussed structure having spaced-apart bottom chords and at least one top chord above the bottom chords. The panels are secured to the cross-arm structure between the spaced-apart bottom chords. Each panel has opposite ends and opposite lateral edges extending between the opposite ends. A plurality of spaced-apart apertures are formed in each panel adjacent each of the lateral edges and at least one of the ends, and each aperture is configured to receive a respective fastener therethrough for securing the panel to the cross-arm structure.

In some embodiments, each panel is formed from a polymeric material and has a thickness between about one eighth inch and about one inch (⅛"-1").

In some embodiments, each panel has a shape that generally conforms to a shape of a portion of the cross-arm structure to which the panel is secured.

In some embodiments, the panels are configured to be secured to the cross-arm structure in end-to-end overlapping arrangement.

In some embodiments, each panel has an inverted-V cross section with first and second portions angled relative to each other, and each panel is configured to be secured to the cross-arm structure with an apex of the inverted-V facing upwardly. In some embodiments, the first and second portions of each panel are angled relative to each other between about one hundred degrees and one hundred sixty degrees (100°-160°). In some embodiments, each panel is in-elastically bent along a centerline end-to-end thereof to form the inverted-V cross section. The sloped configuration of the first and second portions of each panel facilitates the deflection of bird excrement away from the tower and insulators suspended therefrom.

In some embodiments, each panel has an inverted-U cross section and is configured to be secured to the cross-arm structure with an apex of the inverted-U facing upwardly. This rounded configuration facilitates the deflection of bird excrement away from the tower and insulators suspended therefrom.

According to some embodiments of the present invention, the combination of an upright electric power transmission tower and a shield system for the tower are provided. The upright electric power transmission tower includes a base, a cross-arm structure supported by the base, and one or more insulators suspended from the cross-arm structure that support one or more electric cables. The shield system includes a plurality of panels secured to the cross-arm structure in adjacent, end-to-end arrangement so as to overlie the one or more insulators and prevent excrement from birds nesting and congregating on the tower from contacting the one or more insulators.

According to some embodiments of the present invention, a shield system for an electric power transmission tower is provided. The tower has a base, at least one cross-arm structure supported by the base, and one or more insulators suspended from the at least one cross-arm structure and configured to support one or more electric cables. The shield system includes a plurality of non-planar panels configured to be secured to the at least one cross-arm structure in adjacent, end-to-end arrangement so as to overlie the one or more insulators and prevent excrement from birds nesting and congregating on the tower from contacting and accumulating on the one or more insulators. Each panel has a shape that generally conforms to a shape of a portion of the at least one cross-arm structure to which the panel is secured. In some embodiments, each panel is formed from a polymeric material and has a thickness between about one eighth inch and about one inch (⅛"-1").

The shield system of the present invention is easy to install and cost effective because of the inexpensive, lightweight material of the panels. Moreover, the panels are inexpensive to fabricate, and are stackable which facilitates storage and transportation to installation sites. Furthermore, the shield system eliminates the need to clean bird excrement from tower insulators.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

DETAILED DESCRIPTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines illustrate optional features or operations unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

The term "about", as used herein with respect to a value or number, means that the value or number can vary by +/−twenty percent (20%).

Embodiments of the present invention provide a shield system for electric power transmission towers. The shield system includes a plurality of panels configured to be secured to a tower that serve as an umbrella over insulators supported by the tower and that prevent bird excrement from contacting and accumulating on the insulators. The electric power transmission towers 10 described herein are of the lattice type having horizontally extending cross-arms 12 (FIGS. 5A-5B and 6-9) which support the electric conductors or wires 16 that extend from one tower to the next along a row of towers. However, the shield system of the present invention can also be adapted to be attached to non-lattice type towers/structures.

Figure 2:
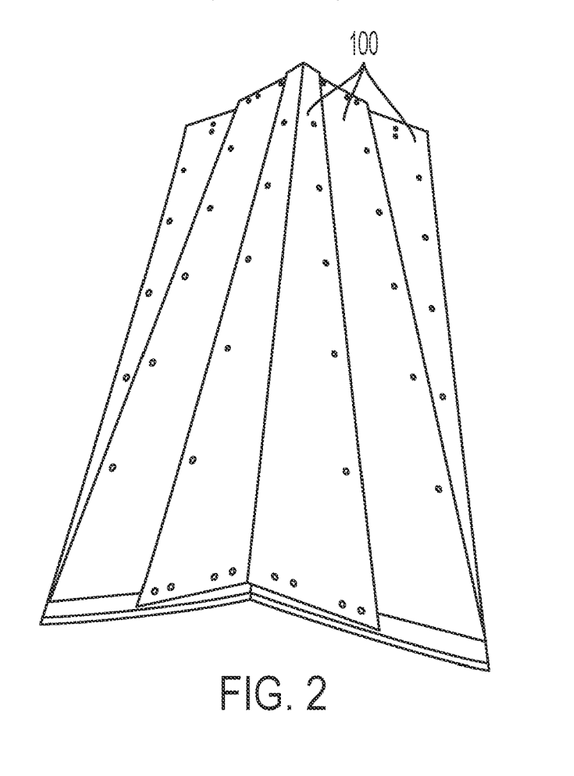
FIG. 2. illustrates a plurality of non-planar panels that are configured to be secured to a cross-arm structure of an electric power transmission tower according to some embodiments of the present invention.
Figure 3A:
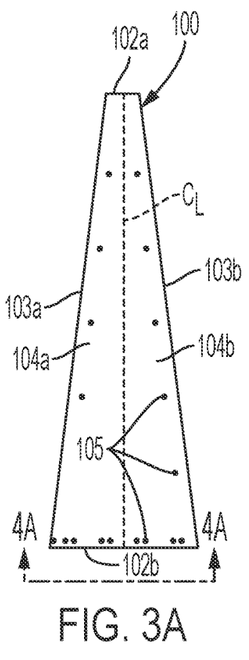
FIGS. 3A, 3B and 3C are plan views of exemplary panels configured to be secured to a cross-arm structure of an electric power transmission tower according to some embodiments of the present invention.
Figure 3B:
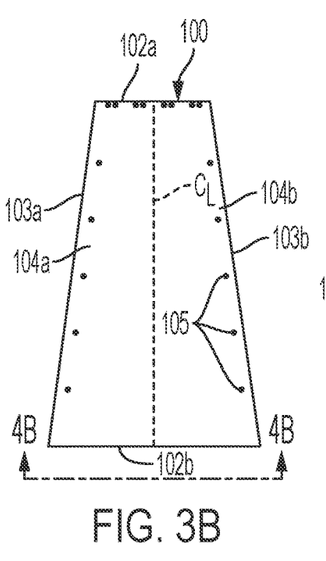
Figure 3C:
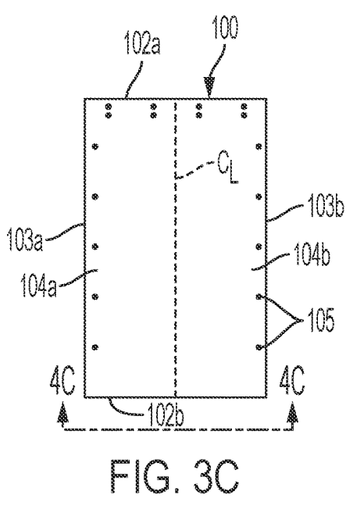
Figure 4A:
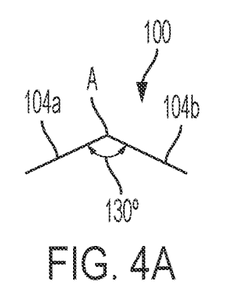
FIG. 4A is a cross-sectional view of the panel of FIG. 3A taken along lines 4A-4A and that illustrates the inverted-V shape of the panel.

FIG. 2 illustrates a plurality of panels 100, according to some embodiments of the present invention, arranged in a stack. The stackable nature of these panels 100, in addition to the generally lightweight nature of these panels 100, facilitates ease of transportation to electric power transmission towers, particularly those in remote locations. These panels 100 will now be described in detail. For example, FIGS. 3A-3C illustrate three exemplary panels 100 of different shapes. The panel 100 illustrated in FIG. 3A has an elongate, triangular shape in plan view with a truncated first end 102*a*, an opposite end 102*b*, and lateral edges 103*a*, 103*b* extending between the opposite ends 102*a*, 102*b*. The panel 100 is bent along a centerline CL end-to-end thereof to form an inverted-V cross section with first and second portions 104*a*, 104*b* angled relative to each other, as illustrated in FIG. 4A. The panel 100 also includes a plurality of spaced-apart installation apertures 105 formed therein adjacent each of the lateral edges 103*a*, 103*b* and the end 102*b*.

Figure 4B:
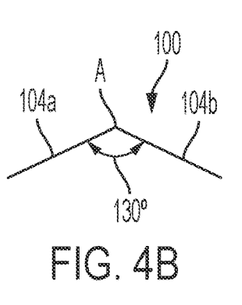
FIG. 4B is a cross-sectional view of the panel of FIG. 3B taken along lines 4B-4B and that illustrates the inverted-V shape of the panel.

The panel 100 illustrated in FIG. 3B has an elongate, triangular shape in plan view that is shorter in length along its centerline CL relative to the panel 100 of FIG. 3A. The illustrated panel 100 of FIG. 3B has a truncated first end 102*a*, an opposite end 102*b*, and lateral edges 103*a*, 103*b* extending between the opposite ends 102*a*, 102*b*. The panel 100 is bent along a centerline CL end-to-end thereof to form an inverted-V cross section with first and second portions 104*a*, 104*b* angled relative to each other, as illustrated in FIG. 4B. The panel 100 also includes a plurality of spaced-apart installation apertures 105 formed therein adjacent each of the lateral edges 103*a*, 103*b* and end 102*a*.

Figure 4C:
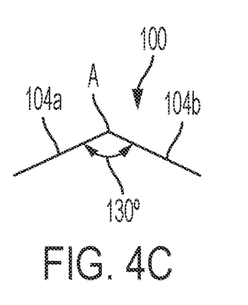
FIG. 4C is a cross-sectional view of the panel of FIG. 3C taken along lines 4C-4C and that illustrates the inverted-V shape of the panel.

The panel 100 illustrated in FIG. 3C has a rectangular shape in plan view with opposite ends 102*a*, 102*b*, and lateral edges 103*a*, 103*b* extending between the opposite ends 102*a*, 102*b*. The panel 100 is bent along a centerline CL end-to-end thereof to form an inverted-V cross section with first and second portions 104*a*, 104*b* angled relative to each other, as illustrated in FIG. 4C. The panel 100 also includes a plurality of spaced-apart installation apertures 105 formed therein adjacent each of the lateral edges 103*a*, 103*b* and the end 102*a*.

Figure 5A:
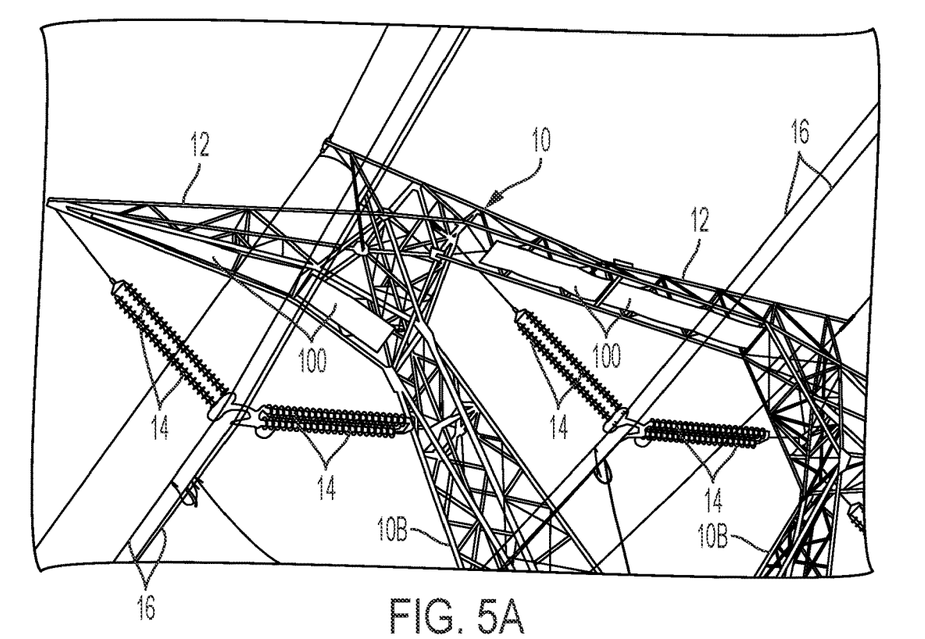
FIGS. 5A-5B are bottom perspective views of an electric power transmission tower with a shield system installed on the cross-arms thereof according to some embodiments of the present invention.
Figure 5B:
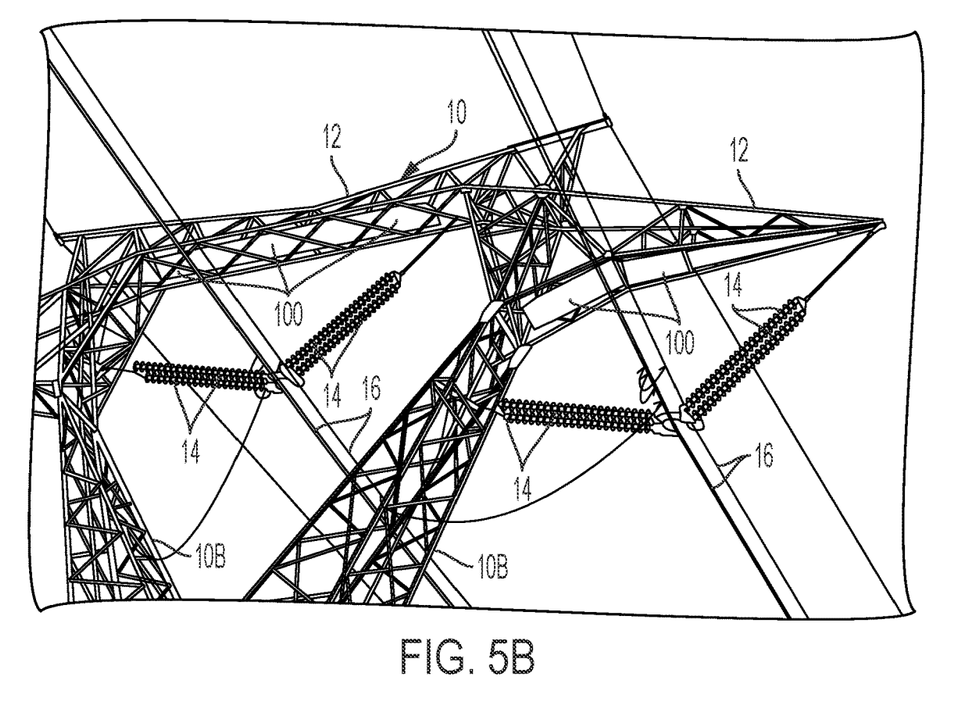

The first and second portions 104*a*, 104*b* of each panel 100 are angled relative to each other, for example, between about one hundred degrees and one hundred sixty degrees (100°-160°). In the illustrated embodiment of FIGS. 4A-4C, the first and second portions 104*a*, 104*b* of each panel 100 are angled relative to each other by one hundred thirty degrees (130°). However, various angles are possible, as long as the panel has a non-planar shape. When installed, each panel 100 is secured to a cross-arm structure of a tower 10 with an apex A (FIGS. 4A-4C) of the inverted-V facing upwardly, as illustrated in FIGS. 5A and 5B.

Figure 4D:
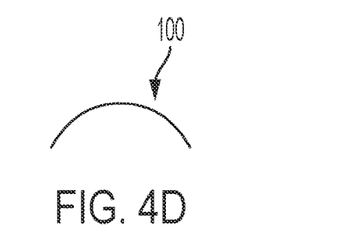
FIG. 4D is a cross-sectional view of a panel having an inverted-U shape according to some embodiments of the present invention.

However, the panels 100 are not limited to having an inverted-V shape. In some embodiments, the panels 100 may have an inverted-U shape as illustrated in FIG. 4D. When installed, a panel 100 having an inverted-U shape is secured to a cross-arm 12 of a tower 10 with an apex of the inverted-U facing upwardly, also. Other non-planar cross-sectional shapes are possible also, and embodiments of the present invention are not limited to any particular cross-sectional shape. The non-planar shape of each panel 100 prevents the buildup of bird excrement on the panel 100, and facilitates the deflection of bird excrement away from a tower cross-arm 12 and away from underlying insulators 14.

The panels 100 of the present invention may be formed from various materials, including polymeric materials, such as polyethylene, polyvinyl chloride, polypropylene, etc. However, various other polymeric materials may be utilized, also. A thickness of each panel 100 is typically about one quarter inch (¼"); however, the thickness of each panel 100 may range between about one eighth of an inch (⅛") and about one inch (1"). Embodiments of the present invention are not limited to panels 100 formed from polymeric materials. In some embodiments, the panels 100 may be formed from aluminum or other lightweight metallic materials. Preferably, the material of each panel 100 is configured to be bent in-elastically. That is, after being bent to form the inverted-V shape (FIGS. 4A-4C), or the inverted-U shape (FIG. 4D), the panel 100 will retain this shape. The surface of each panel 100 is preferably smooth (i.e., slick) in order to reduce friction and help cause any bird excrement thereon to slide off of the panel 100. Preferably, the material of each panel 100 is ultraviolet (UV) resistant in order to increase the life span of the panels 100 when in use.

The apertures 105 formed through the panels 100 may be spaced apart about twelve inches (12") from each other along the lateral edges 103a, 103b, and may be spaced apart along the ends 102a, 102b between about four inches and about twelve inches (4"-12"). The apertures 105 may be spaced apart from the lateral edges 103a, 103b of a panel 100 by about two inches (2"). However, the apertures 105 may be spaced apart by any amount and are not limited to any particular spacing or pattern. In some embodiments, the spacing of apertures 105 may be somewhat random. Each aperture 105 is sized/configured to receive a respective fastener, such as a steel zip tie, therethrough for securing the panel 100 to a cross-arm structure 12 of a tower 10. The use of zip ties facilitates quick and easy installation of the panels 100 to a tower 10, and typically without requiring the use of tools. Exemplary zip ties that may be used are available from Cable Ties Unlimited, 420 Pearl Road, Brunswick, Ohio.

Figure 6:
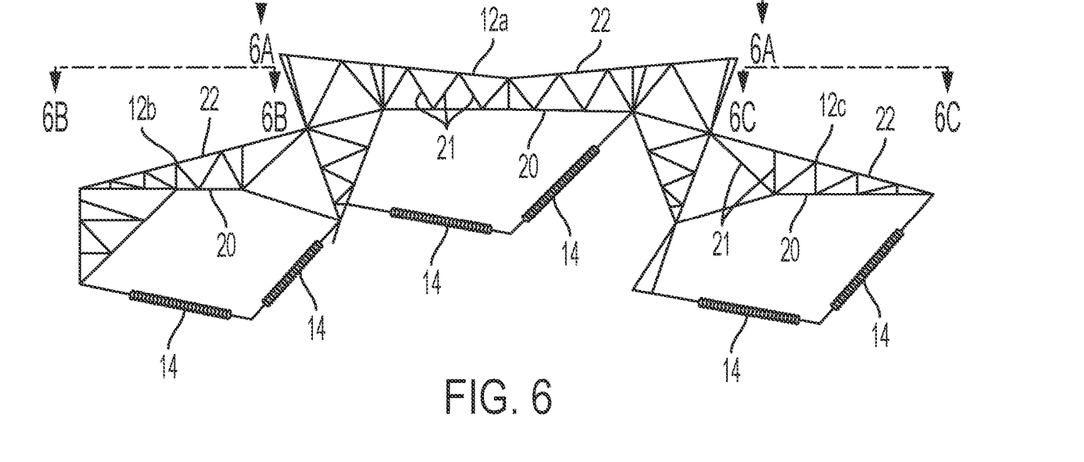
FIG. 6 is a side view of a cross-arm structure for an electric power transmission tower and to which a shield system according to embodiments of the present invention is secured.
Figure 6A:
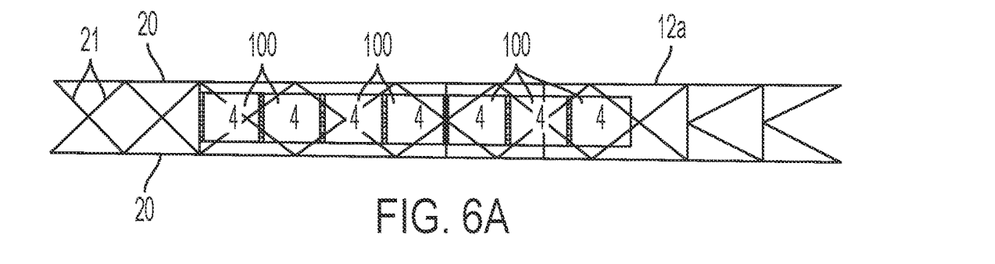
FIG. 6A is a top plan view of a portion of the cross-arm structure of FIG. 6 taken along lines 6A-6A and illustrating a plurality of panels secured thereto between the bottom chords of the structure.
Figure 6B:
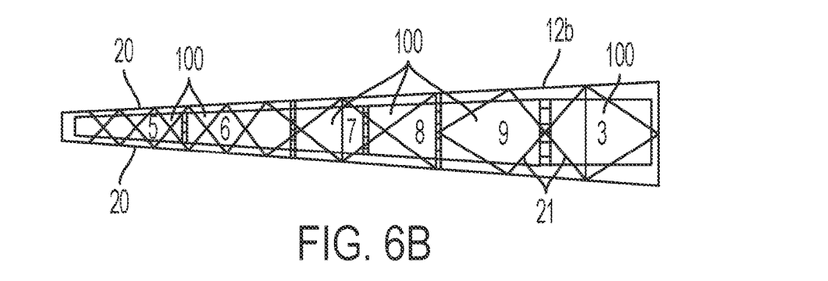
FIG. 6B is a top plan view of a portion of the cross-arm structure of FIG. 6 taken along lines 6B-6B and illustrating a plurality of panels secured thereto between the bottom chords of the structure.
Figure 6C:
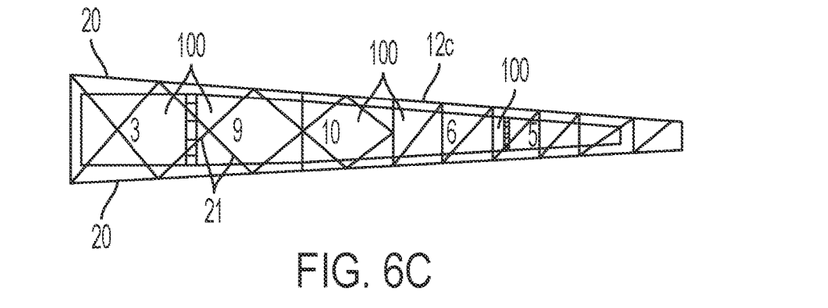
FIG. 6C is a top plan view of a portion of the cross-arm structure of FIG. 6 taken along lines 6C-6C and illustrating a plurality of panels secured thereto between the bottom chords of the structure.

Referring to FIG. 6, a side view of a cross-arm structure for an electric power transmission tower and to which a shield system according to embodiments of the present invention is secured, is illustrated. The illustrated cross-arm structure includes three cross arms 12a, 12b, 12c which are supported by a base 10B of a tower 10 (FIGS. 5A, 5B). Each of the cross arms 12a, 12b, 12c contains a plurality of panels 100 secured thereto. For example, the central cross arm 12a has a plurality of panels 100 secured thereto as illustrated in FIG. 6A, the left cross arm 12b has a plurality of panels 100 secured thereto as illustrated in FIG. 6B, and the right cross arm 12c has a plurality of panels 100 secured thereto as illustrated in FIG. 6C. Each cross-arm 12a, 12b, 12c is a trussed structure with spaced-apart bottom chords 20 and at least one top chord 22 above the bottom chords 20. The bottom chords 20 are connected via cross braces 21 and the bottom chords 20 and top chords 22 are connected via cross braces 21 to create the trussed structure as would be understood by one skilled in the art. The panels 100 are secured to each cross-arm 12a, 12b, 12c between the spaced-apart bottom chords 20. The panels 100 may be secured to any portion of the truss structure, including bottom chords 20 and/or cross braces 21.

As illustrated in FIGS. 6A-6C, each panel 100 has a shape that generally conforms to a shape of a portion of the cross-arm 12a, 12b, 12c to which the panel 100 is secured. For example, the cross arm 12a has a generally rectangular shape and the panels 100 secured thereto also have a generally rectangular shape when viewed in plan view. In FIGS. 6B and 6C, the cross-arms 12b, 12c have a generally triangular shape and some of the panels 100 secured thereto have a generally triangular shape when viewed in plan view. As illustrated in FIGS. 6A-6C, the panels 100 need not extend all the way to the bottom chords 20 of each cross-arm 12a, 12b, 12c, as long as each panel 100 is sufficiently wide enough to serve as an "umbrella" and protect an underlying insulator 14 from bird excrement.

As illustrated in FIGS. 6A-6C, the panels 100 are secured to the cross-arms 12a, 12b, 12c in adjacent, end-to-end arrangement. In some embodiments, the panels 100 are secured to the cross-arms 12a, 12b, 12c in end-to-end overlapping arrangement. For example, in some embodiments adjacent ends of two panels 100 may overlap between about one inch and about six inches (1"-6"), although other dimensions are possible.

Figure 7:
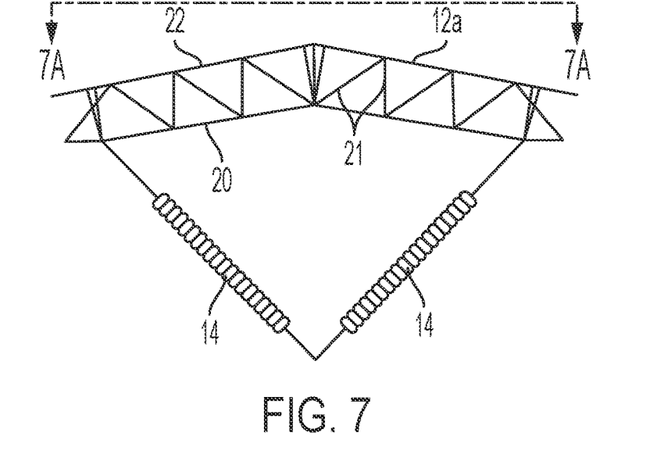
FIG. 7 is a side view of a cross-arm structure for an electric power transmission tower and to which a shield system according to embodiments of the present invention is secured.
Figure 7A:
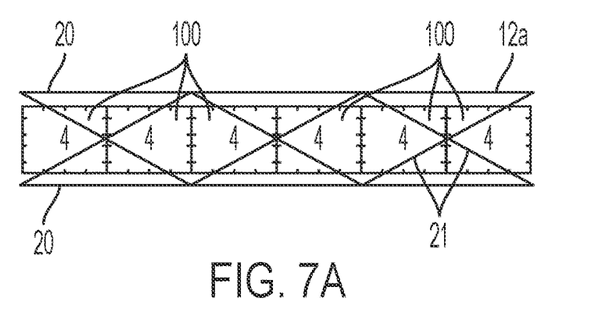
FIG. 7A is a top plan view of a portion of the cross-arm structure of FIG. 7 taken along lines 7A-7A and illustrating a plurality of panels secured thereto between the bottom chords of the structure.
Figure 8:
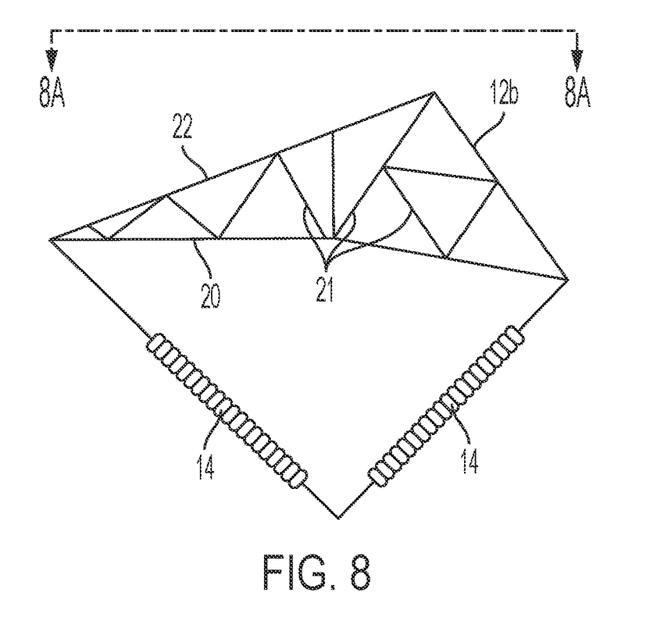
FIG. 8 is a side view of a cross-arm structure for an electric power transmission tower and to which a shield system according to embodiments of the present invention is secured.
Figure 8A:
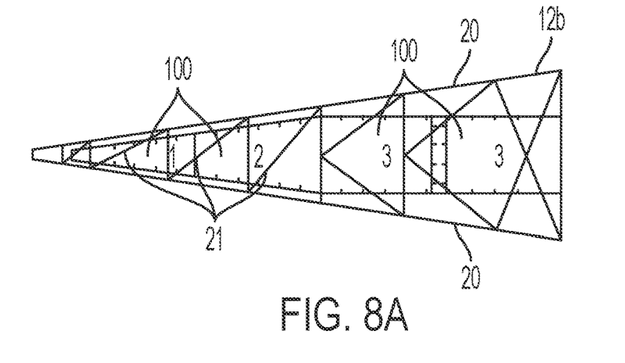
FIG. 8A is a top plan view of a portion of the cross-arm structure of FIG. 8 taken along lines 8A-8A and illustrating a plurality of panels secured thereto between the bottom chords of the structure.
Figure 9:
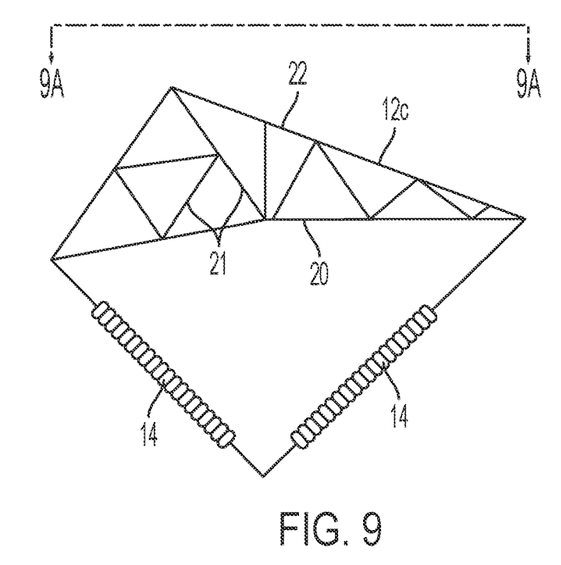
FIG. 9 is a side view of a cross-arm structure for an electric power transmission tower and to which a shield system according to embodiments of the present invention is secured.
Figure 9A:
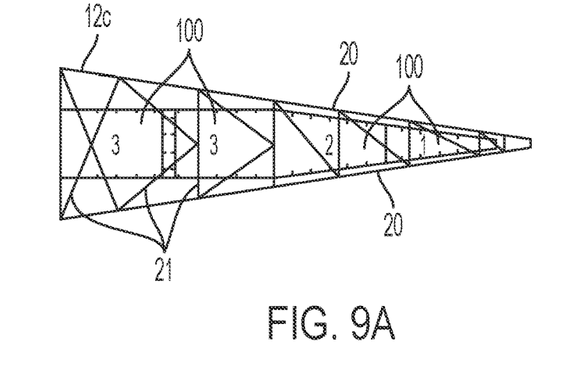
FIG. 9A is a top plan view of a portion of the cross-arm structure of FIG. 9 taken along lines 9A-9A and illustrating a plurality of panels secured thereto between the bottom chords of the structure.

FIGS. 7-9 are side views of other cross-arms 12a, 12b, 12c for an electric power transmission tower/structure and to which a shield system according to embodiments of the present invention can be secured. The illustrated cross-arms 12a, 12b, 12c each have a plurality of panels 100 secured thereto as illustrated in FIGS. 7A, 8A, 9A.

Panels 100 according to embodiments of the present invention can be installed on any type of tower cross-arm/structure or other structure that supports electric power cables, without limitation. Embodiments of the present invention are not limited to installation on the towers and cross-arm structures illustrated herein.

In the illustrated embodiments of FIGS. 6A-6C, 7A, 8A, 9A, the panels 100 have designated configurations indicated by numbers. Different cross arm structure configurations require a specific set of panels. For example, the cross-arm 12a in FIG. 6A utilizes panels 100 with the designated number "4". The cross-arm 12b in FIG. 6B utilizes panels 100 with the designated numbers "3", "9", "8", "7", "6" and "5". The cross-arm 12c in FIG. 6C utilizes panels 100 with the designated numbers "3", "9", "10", "6", and "5". Each numbered panel 100 has a respective shape when viewed in plan view as illustrated in FIGS. 10A-10L. Various combinations of panels can be utilized to meet the configuration of a particular cross-arm structure.

FIGS. 10A-10L illustrate twelve different exemplary panel configurations, labeled 1-12, respectively. For example, the panel 100 illustrated in FIG. 10A with the designated number "1" has an elongate, triangular shape in plan view with a truncated first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is seventy two inches (72"), the width of end 102a is six inches (6"), and the width of end 102b is twenty six inches (26").

Figure 10A:
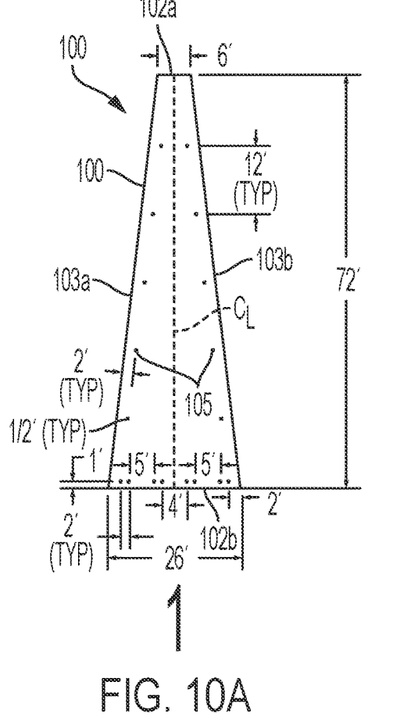
FIGS. 10A-10L are plan views of exemplary panels configured to be secured to a cross-arm structure of an electric power transmission tower according to some embodiments of the present invention.
Figure 10B:
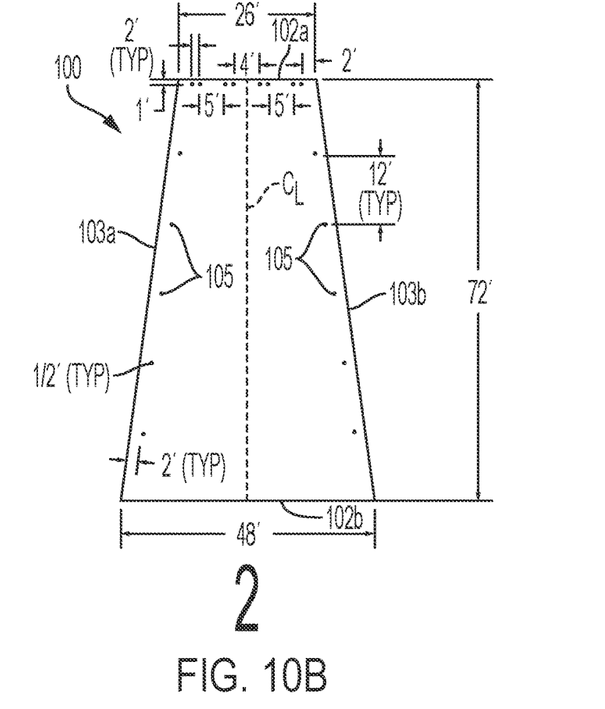

The panel 100 illustrated in FIG. 10B with the designated number "2" has an elongate, triangular shape in plan view with a truncated first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is seventy two inches (72"), the width of end 102a is twenty six inches (26"), and the width of end 102b is forty eight inches (48").

Figure 10C:
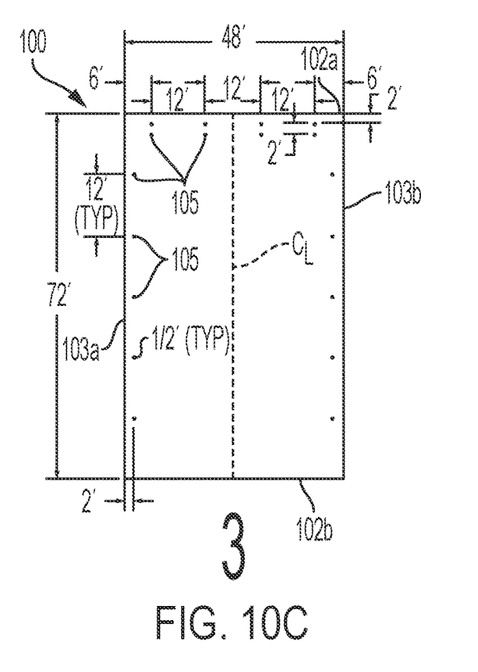

The panel 100 illustrated in FIG. 10C with the designated number "3" has a rectangular shape in plan view with a first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is seventy two inches (72"), and the width of the ends 102a, 102b is forty eight inches (48").

Figure 10D:
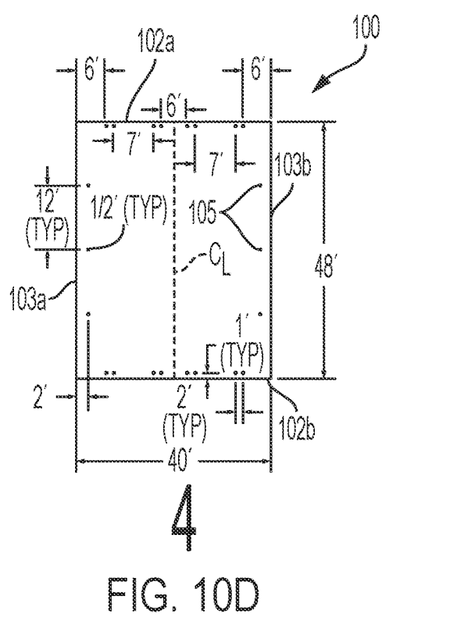

The panel 100 illustrated in FIG. 10D with the designated number "4" has a rectangular shape in plan view with a first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is forty eight inches (48"), and the width of the ends 102a, 102b is forty inches (40").

Figure 10E:
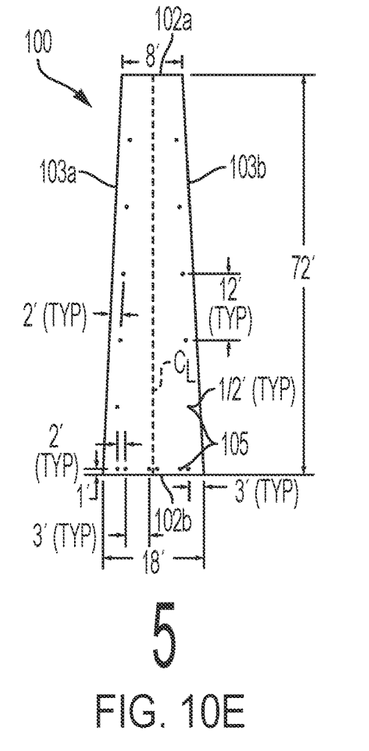

The panel 100 illustrated in FIG. 10E with the designated number "5" has an elongate, triangular shape in plan view with a truncated first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is seventy two inches (72"), the width of end 102a is eight inches (8"), and the width of end 102b is eighteen inches (18").

Figure 10F:
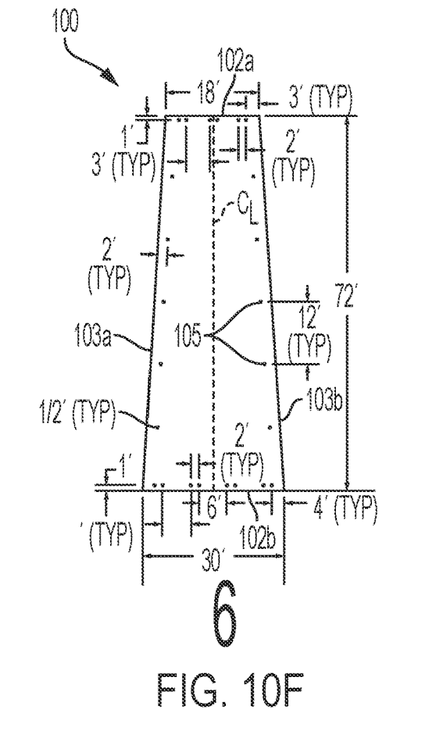

The panel 100 illustrated in FIG. 10F with the designated number "6" has an elongate, triangular shape in plan view with a truncated first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is seventy two inches (72"), the width of end 102a is eighteen inches (18"), and the width of end 102b is thirty inches (30").

Figure 10G:
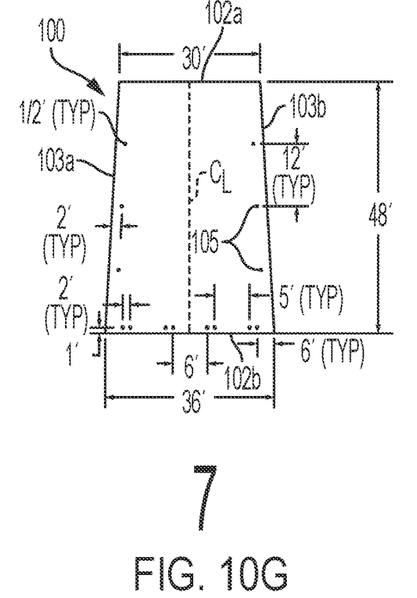

The panel 100 illustrated in FIG. 10G with the designated number "7" has an elongate shape in plan view with a first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is forty eight inches (48"), the width of end 102a is thirty inches (30"), and the width of end 102b is thirty six inches (36").

Figure 10H:
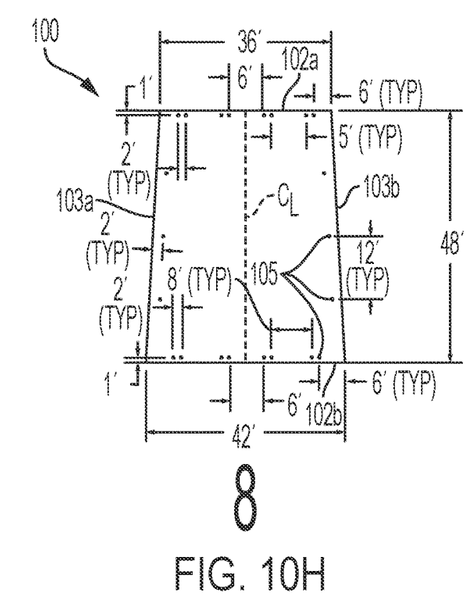

The panel 100 illustrated in FIG. 10H with the designated number "8" has an elongate shape in plan view with a first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is forty eight inches (48"), the width of end 102a is thirty six inches (36"), and the width of end 102b is forty two inches (42").

Figure 10I:
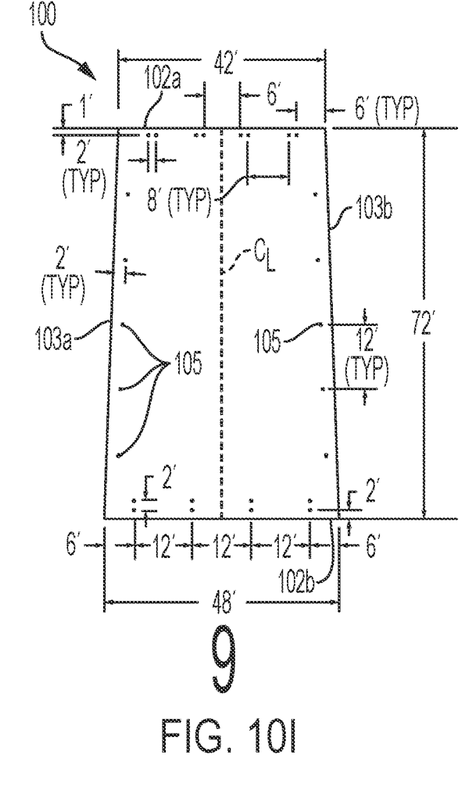

The panel 100 illustrated in FIG. 10I with the designated number "9" has an elongate shape in plan view with a first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is seventy two inches (72"), the width of end 102a is forty two inches (42"), and the width of end 102b is forty eight inches (48").

Figure 10J:
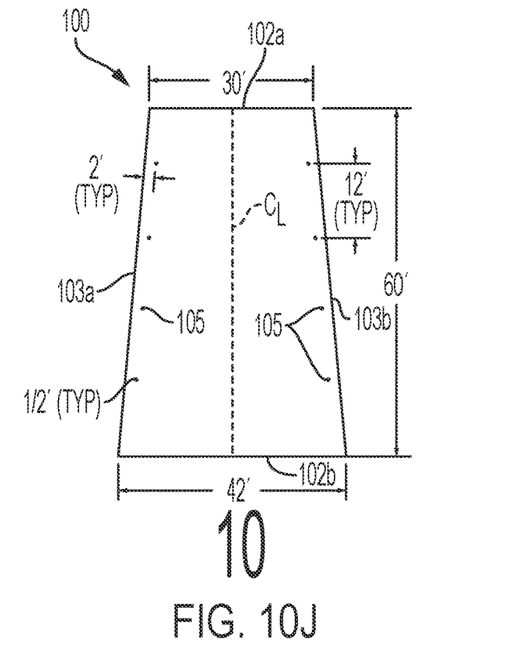

The panel 100 illustrated in FIG. 10J with the designated number "10" has an elongate shape in plan view with a first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is sixty inches (60"), the width of end 102a is thirty inches (30"), and the width of end 102b is forty two inches (42").

Figure 10K:
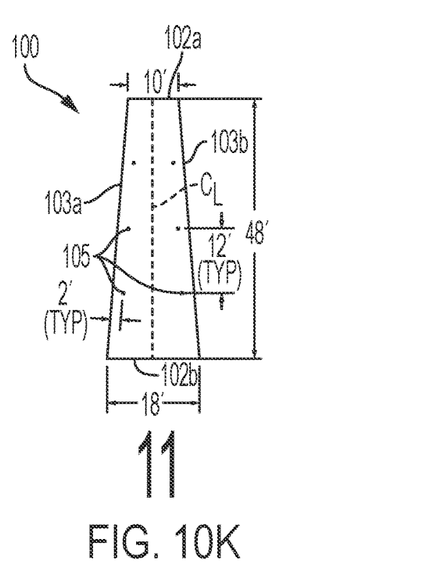

The panel 100 illustrated in FIG. 10K with the designated number "11" has an elongate, triangular shape in plan view with a truncated first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is forty eight inches (48"), the width of end 102a is ten inches (10"), and the width of end 102b is eighteen inches (18").

Figure 10L:
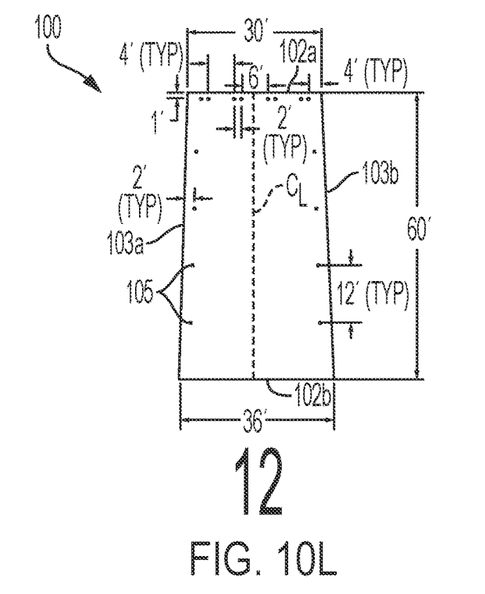

The panel 100 illustrated in FIG. 10L with the designated number "12" has an elongate shape in plan view with a first end 102a, an opposite end 102b, and lateral edges 103a, 103b extending between the opposite ends 102a, 102b. The panel 100 is bent along a centerline CL end-to-end thereof to form an inverted-V cross section. The length of the panel 100 is sixty inches (60"), the width of end 102a is thirty inches (30"), and the width of end 102b is thirty six inches (36").

Embodiments of the present invention are not limited to the illustrated panel configurations and sizes in FIGS. 10A-10L. Panels 100 may have various other shapes, configurations and sizes without limitation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A shield system for an electric power transmission tower, the tower having a base and a cross-arm structure supported by the base, wherein one or more insulators are suspended from the cross-arm structure to support one or more electric cables, the shield system comprising a plurality of panels, each panel defining a longitudinal direction, and wherein the panels are configured to be secured to the cross-arm structure in adjacent, end-to-end arrangement such that the panels are longitudinally aligned, and such that the panels are spaced apart from and overlie the one or more insulators to prevent excrement from birds nesting and/or congregating on the tower from contacting the one or more insulators.

2. The shield system of claim 1, wherein each panel has a shape that generally conforms to a shape of a portion of the cross-arm structure to which the panel is secured.

3. The shield system of claim 1, wherein the panels are configured to be secured to the cross-arm structure in end-to-end overlapping arrangement.

4. The shield system of claim 1, wherein the cross-arm structure is a trussed structure comprising spaced-apart bottom chords and at least one top chord above the bottom chords, and wherein the panels are secured to the cross-arm structure between the spaced-apart bottom chords.

5. The shield system of claim 1, wherein each panel comprises opposite ends and opposite lateral edges extending between the opposite ends, and wherein a plurality of spaced-apart apertures are formed in the panel adjacent each of the lateral edges and at least one of the ends, wherein each aperture is configured to receive a respective fastener therethrough for securing the panel to the cross-arm structure.

6. The shield system of claim 1, wherein each panel has an inverted-V cross section with first and second portions angled relative to each other, and wherein each panel is configured to be secured to the cross-arm structure with an apex of the inverted-V facing upwardly.

7. The shield system of claim 6, wherein the first and second portions of each panel are angled relative to each other between about one hundred degrees and one hundred sixty degrees (100°-160°).

8. The shield system of claim 6, wherein each panel is in-elastically bent along a centerline end-to-end thereof to form the inverted-V cross section.

9. The shield system of claim 1, wherein each panel has an inverted-U cross section and is configured to be secured to the cross-arm structure with an apex of the inverted-U facing upwardly.

10. The shield system of claim 1, wherein each panel comprises a polymeric material and has a thickness between about one eighth inch and about one inch (⅛"-1").

11. In combination,
an upright electric power transmission tower having a base and a cross-arm structure supported by the base, wherein the cross-arm structure is a trussed structure comprising spaced-apart bottom chords and at least one top chord above the bottom chords, and wherein one or more insulators are suspended from the cross-arm structure to support one or more electric cables; and a plurality of panels secured to the cross-arm structure in adjacent, end-to-end arrangement so as to overlie the one or more insulators and prevent excrement from birds nesting and/or congregating on the tower from contacting the one or more insulators, wherein the panels are secured to the cross-arm structure between the spaced-apart bottom chords.

12. The combination of claim 11, wherein each panel has a shape that generally conforms to a shape of a portion of the cross-arm structure to which the panel is secured.

13. The combination of claim 11, wherein the panels are secured to the cross-arm structure in end-to-end overlapping arrangement, and such that adjacent ends of the panels overlap each other up to about six inches (6").

14. The combination of claim 11, wherein each panel comprises opposite ends and opposite lateral edges extending between the opposite ends, and wherein a plurality of spaced-apart apertures are formed in the panel adjacent each of the lateral edges and at least one of the ends, wherein each aperture is configured to receive a respective fastener therethrough for securing the panel to the cross-arm structure.

15. The combination of claim 11, wherein each panel has an inverted-V cross section, and wherein each panel is secured to the cross-arm structure with an apex of the inverted-V facing upwardly.

16. The combination of claim 11, wherein each panel has an inverted-U cross section and is configured to be secured to the cross-arm structure with an apex of the inverted-U facing upwardly.

17. The combination of claim 11, wherein each panel comprises a polymeric material and has a thickness between about one eighth inch and about one inch (1/8"-1").

18. A shield system for an electric power transmission tower, the tower having a base and at least one cross-arm structure supported by the base, wherein one or more insulators are suspended from the at least one cross-arm structure to support one or more electric cables, the shield system comprising a plurality of non-planar panels, each panel defining a longitudinal direction, and wherein the panels are configured to be secured to the at least one cross-arm structure in adjacent, end-to-end arrangement such that the panels are longitudinally aligned, and such that the panels are spaced apart from and overlie the one or more insulators to prevent excrement from birds nesting and/or congregating on the tower from contacting the one or more insulators, wherein each panel has a shape and that generally conforms to a shape of a portion of the at least one cross-arm structure to which the panel is secured.

19. The shield system of claim 18, wherein each panel comprises a polymeric material and has a thickness between about one eighth inch and about one inch (1/8"-1").

* * * * *